United States Patent
Khan et al.

(10) Patent No.: US 7,656,413 B2
(45) Date of Patent: Feb. 2, 2010

(54) LARGE DISPLAY ATTENTION FOCUS SYSTEM

(75) Inventors: Azam Khan, Ontario (CA); Justin Frank Matejka, Ontario (CA); George William Fitzmaurice, Ontario (CA); Gordon Paul Kurtenbauch, Ontario (CA)

(73) Assignee: Autodesk, Inc., San Rafael, CA (US)

( * ) Notice: Subject to any disclaimer, the term of this patent is extended or adjusted under 35 U.S.C. 154(b) by 98 days.

(21) Appl. No.: 11/391,645

(22) Filed: Mar. 29, 2006

(65) Prior Publication Data

US 2007/0234220 A1    Oct. 4, 2007

(51) Int. Cl.
G09G 5/00 (2006.01)
G06K 9/20 (2006.01)
G06F 3/00 (2006.01)
G06F 3/048 (2006.01)

(52) U.S. Cl. .............. 345/589; 345/156; 345/594; 345/619; 345/581; 715/700; 715/764; 715/772; 715/860; 382/282; 382/283

(58) Field of Classification Search ............. 715/745, 715/764, 700, 742, 767, 772, 855–861; 345/589, 345/594, 619, 688, 156–160, 581, 592; 382/282–283, 382/276, 306, 254, 274
See application file for complete search history.

(56) References Cited

U.S. PATENT DOCUMENTS

| | | | |
|---|---|---|---|
| 6,057,844 A | 5/2000 | Strauss | |
| 6,100,895 A * | 8/2000 | Miura et al. | 345/426 |
| 6,204,849 B1 * | 3/2001 | Smith | 715/835 |
| 6,246,411 B1 * | 6/2001 | Strauss | 715/863 |
| 6,385,882 B1 * | 5/2002 | Conley et al. | 40/454 |
| 2001/0051971 A1 * | 12/2001 | Kato | 709/102 |
| 2002/0045825 A1 * | 4/2002 | Liu et al. | 600/443 |
| 2003/0100964 A1 * | 5/2003 | Kluge et al. | 700/83 |
| 2004/0100487 A1 * | 5/2004 | Mori et al. | 345/724 |
| 2006/0018547 A1 * | 1/2006 | Ouchi | 382/190 |
| 2006/0101347 A1 * | 5/2006 | Runov et al. | 715/764 |
| 2007/0033172 A1 * | 2/2007 | Williams et al. | 707/3 |
| 2007/0126732 A1 * | 6/2007 | Robertson et al. | 345/419 |
| 2007/0237404 A1 * | 10/2007 | Strom | 382/232 |
| 2008/0219493 A1 * | 9/2008 | Tadmor | 382/100 |

OTHER PUBLICATIONS

Azam Khan et al., "Spotlight: Directing Users' Attention on Large Displays", Papers: Enhancing Virtual Spaces and Large Displays, CHI 2005, Apr. 2-7, 2005, Portland, Oregon.

* cited by examiner

Primary Examiner—Wesner Sajous
(74) Attorney, Agent, or Firm—Staas & Halsey LLP

(57) ABSTRACT

A system that allows a user to spotlight a region of particular interest in a large-scale display, such as a wall panel display. The spotlight can be a circular or other shape area around which the display is de-emphasized, such as by being darkened or blurred outside the circle. The spotlight can be moved by the user moving a cursor positioned in the circle. When the cursor encounters an edge of the circle the spotlight is moved in the direction of cursor movement. As the cursor is moved the outside region has less de-emphasis. When the movement is stopped the outside region is darkened to the maximum. A spotlight beam or other attention directing area of emphasis can be used to help focus a viewer's attention on the spotlight. The spotlight can follow objects in a scene as they move.

26 Claims, 9 Drawing Sheets

LARGE DISPLAY ATTENTION FOCUS SYSTEM

CROSS-REFERENCE TO RELATED APPLICATION(S)

This application is related to U.S. application entitled Tracking Menus, System and Method having Ser. No. 10/684,580, by Fitzmaurice, filed Oct. 15, 2003 and incorporated by reference herein.

BACKGROUND OF THE INVENTION

1. Field of the Invention

The present invention is directed to a system for directing the attention of audience members viewing a large-scale display and, more particularly, to a system that de-emphasizes portions of the display not pointed out by a spotlight.

2. Description of the Related Art

During a meeting or presentation in which a large-scale display, such as a wall panel display, is used, users or presenters frequently like to convey or point out an area of interest to other users or audience members to focus their attention on a particular area of the displays. This can be accomplished verbally by telling the users where to look or spatially by pointing to a target.

What is needed is a better approach to focusing attention on an area of interest in large-scale displays.

SUMMARY OF THE INVENTION

It is an aspect of the embodiments discussed herein to provide techniques that spotlights an area of interest on a large-scale display by de-emphasizing areas of the display that are of lesser interest.

It is another aspect of the embodiments to allow the spotlight to be moved about on the display using a display cursor.

It is a further aspect of the embodiments to direct a viewer's attention to the spotlight.

It is also an aspect of the embodiments to provide a spotlight that follows a target.

It is an additional aspect of the embodiments to allow pointing within the spotlight.

It is a further aspect of the embodiments to deemphasize the content outside the spotlight.

The above aspects can be attained by a system that allows a user to spotlight a region of a display that is of particular interest. The spotlight can be a circular area around which the display is de-emphasized, such as by being darkened outside the circle. The spotlight can be moved by the user moving a cursor positioned in the circle. When the cursor encounters an edge of the circle the spotlight is moved in the direction of cursor movement. As the cursor is moved the outside region has less de-emphasis. A spotlight beam can be used to help focus a viewer's attention on the spotlight.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
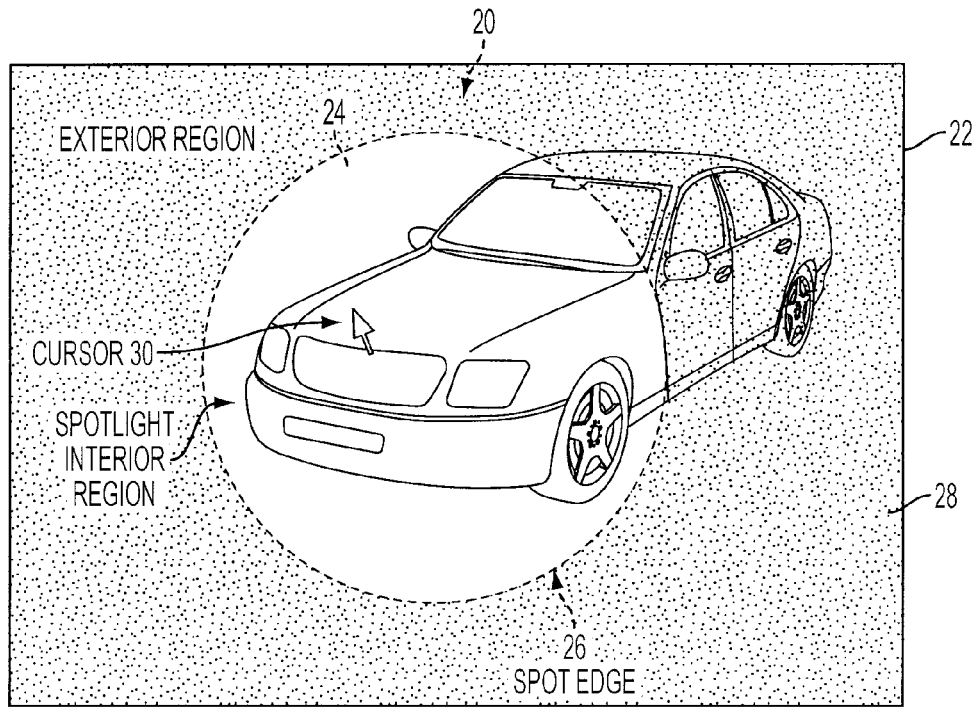
FIG. 1 illustrates a spotlight according to an embodiment discussed herein.

The embodiments of present invention addresses the issues discussed above by providing an attention direction mechanism on large computer displays that, for convenience, is called a spotlight. The spotlight is graphical user interface region designed to attract the attention of audience members viewing a large wall type display. The spotlight is a region of the display where the contents are displayed normally while the remainder of the display is somewhat darkened.

In particular, in an embodiment, the spotlight 20 (see FIG. 1) appears on a display 22 and includes an interior region 24, a spot edge 26, an exterior region 28, and a user controlled cursor 30. The spotlight technique, once invoked, begins by darkening (or de-emphasizing) the contents of the display 22 by a predetermined amount (preferably about 75%) except for the circular region 24 around the current cursor position. This serves to draw the viewer's attention to the current region of interest. The spotlight 20 follows the cursor as it is moved. Unlike a real physical spotlight, while the spotlight is moving, the dark exterior region 28 of the spotlight is brightened up (preferably to about 50%) allowing the user to more easily see the intended destination. After the spotlight 20 stops moving, after a short dwell time, the exterior region of the spotlight again slowly darkens to the maximum darkness setting.

To combine the two functions of pointing with the cursor and repositioning the spotlight, the spotlight preferably behaves like a tracking menu as discussed in the related application noted above. Tracking menus have the advantageous property of allowing the cursor to move about freely within a given region but when the cursor moves beyond the edge 26 of the region, the region 24 moves in the direction of the cursor movement. In this way, the user can move the cursor 30 to point to a specific location within the spotlight 20 to note a particular feature, as well as "drag" the spotlight 20 to a new position, combining the specification of both a position and a region into one tool.

Figure 2:
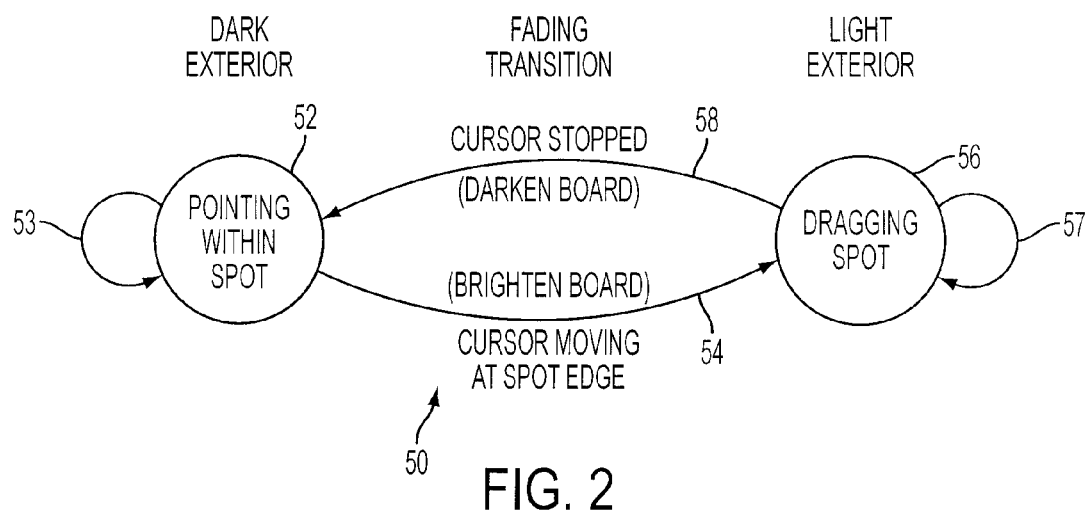
FIG. 2 shows spotlight behavior.

These actions are depicted in the state diagram 50 of FIG. 2. When the cursor 30 is within the region 24 and not "against" the edge 26, the process resides in state 52 where the exterior region 28 (see FIG. 1) is at the maximum darkness and cursor move events 53 return to state 52. When the cursor is being moved and encounters the edge 26, a transition 54 to the dragging state 56 occurs. In this transition 54, the exterior region 28 is preferably brightened (less de-emphasis or darkening). While the dragging state 56 exists (the cursor is being moved and is against the edge 26) the exterior region 28 remains lightened (less de-emphasis) and cursor events 57 return to state 56. When the cursor stops moving or is moved away from the edge 26 by the user, a transition 58 occurs from state 56 to state 52. In this transition 58, the exterior region 28 is returned to the maximum darkened state 52.

The diameter of the spotlight 20 can be resized by scrolling the thumbwheel on the mouse. As will be discussed in more detail later herein, the spotlight 20 is created by applying or compositing a transparency mask (see FIG. 6) to the display contents initially at the position of the cursor.

Figure 3:
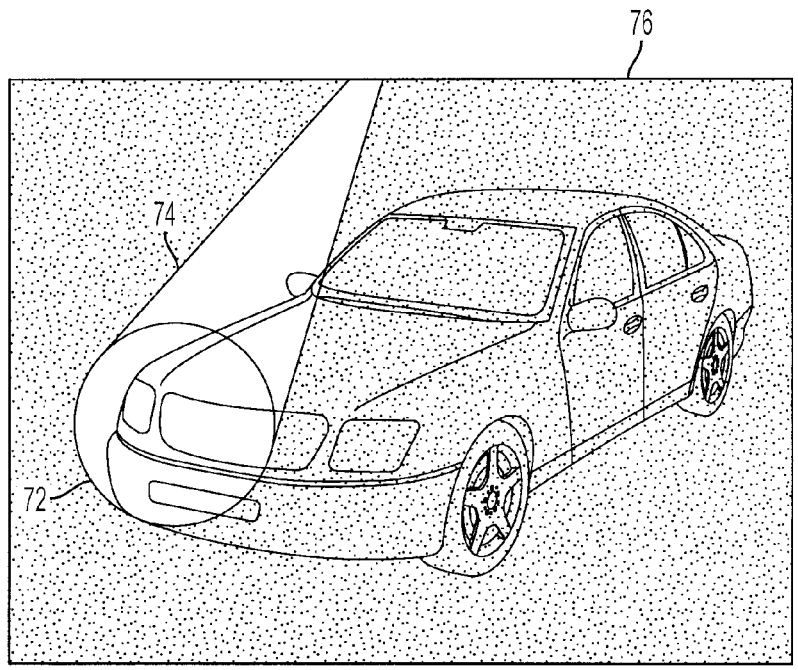
FIG. 3 shows a spotlight with an attention-directing beam.

As depicted FIG. 3, a spotlight 72 can have an optional "beam" 74 coming down from a center of the display 76 or some set position typically located on the perimeter of the display. This option provides the audience a well-defined starting point to locate or re-acquire the spotlight 72 when the spotlight is initially presented or after the spotlight is moved or when the user returns their attention to the display from some other attention getting source such as a speaker for a presentation. The audience member knows that when the spotlight is not in their field of view, they can simply look toward the center of the display and follow the beam, which quickly guides them to the target spotlight region.

A number of variations of the spotlight are depicted in FIG. 4. FIG. 4(b) shows the simple circular spotlight previously discussed. This design was slightly more effective than the searchlight of FIG. 4(e) because there are no other distracting elements on screen. The searchlight (see FIG. 4 (e)) has an additional beam to direct the user's attention, but it is possible that this can slow down the target acquisition in that, once the user looks within the beam, the eye is drawn linearly all the way down it to the spotlight region. This effect may make it difficult to skip directly down to the spotlight. An issue with the simple circular spotlight (FIG. 4(b)) can be an ongoing need to resize it. In practice, an audience typically views objects in a variety of sizes. And due to the overall aspect ratio of a large wall display (72' by 9') the presenter often tries to layout objects to use the full height of the screen, as there is adequate width. Another embodiment is a vertical bar spotlight as shown in FIG. 4(c). This is, for convenience, is called a spotlight curtain because when resizing it, it opens and closes in width, much like a curtain. A variation on this embodiment is a curtain that increases the cone angle of the light, that is, the curtain width at the bottom of the screen only (see FIG. 4(d)). The curtain can also be a horizontal bar spotlight for highlighting rows of information like a row in a spreadsheet program such as Microsoft Excel.

Figure 4A:
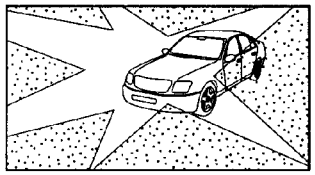
FIG. 4 shows embodiment variations on the spotlight.
Figure 4B:
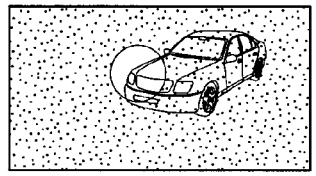
Figure 4C:
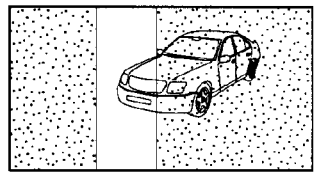
Figure 4D:
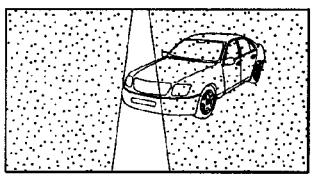
Figure 4E:
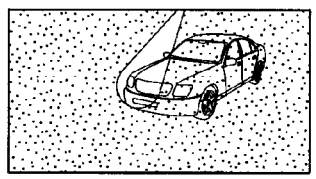
Figure 4F:
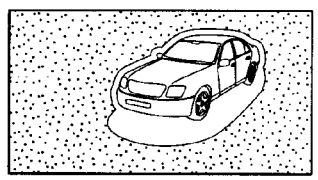
Figure 4G:
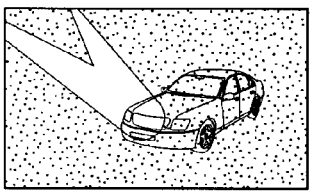
Figure 4H:
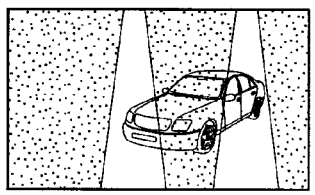
Figure 4I:
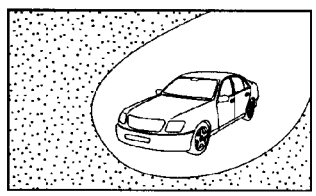

To reduce the need to resize the spotlight, another embodiment is provided as a shape-based spotlight, as shown in FIG. 4(f), which uses an alpha channel of the object to create the spotlight border. While this is effective in always highlighting an entire object, it comes at the cost of not being able to point the spotlight to an area within an object. This emphasis of the shape can be distracting as well and a spotlight in the shape of the bounding ellipse of the object, as depicted in FIG. 4(i) may be more appealing. The embodiments also include multiple spotlights as shown FIGS. 4(a), 4(g) and 4(h)) that can be used as spotlights to represent the interest of multiple users or presenters.

A further embodiment involves using alternatives to the brighten/darken effect in the spotlight/exterior region. For example, the system can adjust the content saturation, tint, pixelation or blur in the exterior region, or use other conventional visual effects to differentiate the regions.

Figure 5:
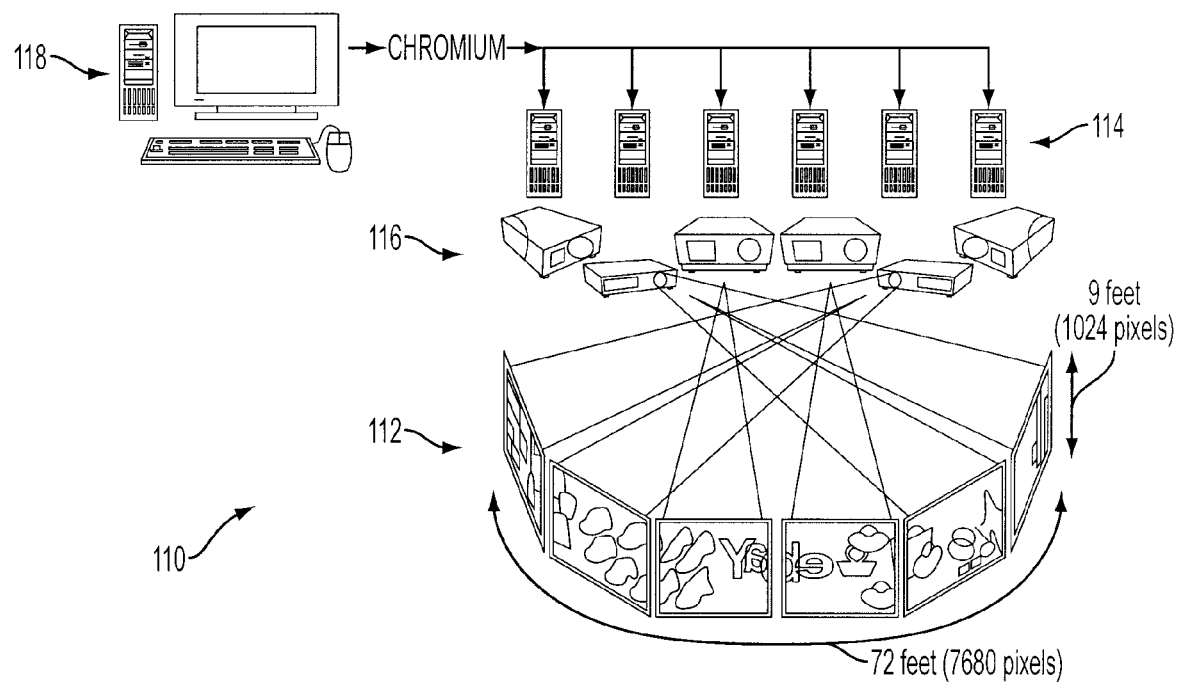
FIG. 5 illustrates a multi-projector spotlight system.

The embodiments of the present invention can typically be embodied in a system 110 as depicted in FIG. 5. This system includes a semi-circular projection wall 112 with six panels running on six workstations 114 driving six projectors 116 with screen space measuring 72' wide by 9' tall and a combined resolution of 7680 by 1024 pixels. Chromium networking software can be used for scalable real-time OpenGL rendering on a cluster of workstations. The spotlight process preferably runs on a "mothership," machine 118 where the input is collected and the OpenGL calls are intercepted by Chromium. The spotlight process is preferably written in C++ under Windows XP and uses the standard Windows API for event handling. The OpenGL calls are then divided, packed, and sent to one of the other six machines 114, acting as servers. These servers 114 each drive a corresponding projector 116 and are responsible for rendering and displaying $\frac{1}{6}^{th}$ of the total display. The mothership 118 is preferably an HP dual Xeon 2.8 GHz PC with an nVidia Quadro FX1000 graphics card, while dual Xeon 3.2 GHz processors, and one of either an nVidia Quadro FX1000 or an ATI FireGL X1 graphics card powers each of the servers. All of the servers 116 are controlled from one HP workstation using VNC. The projectors need not be front projectors but could be rear projectors or other types, such as volumetric displays.

Figure 6:
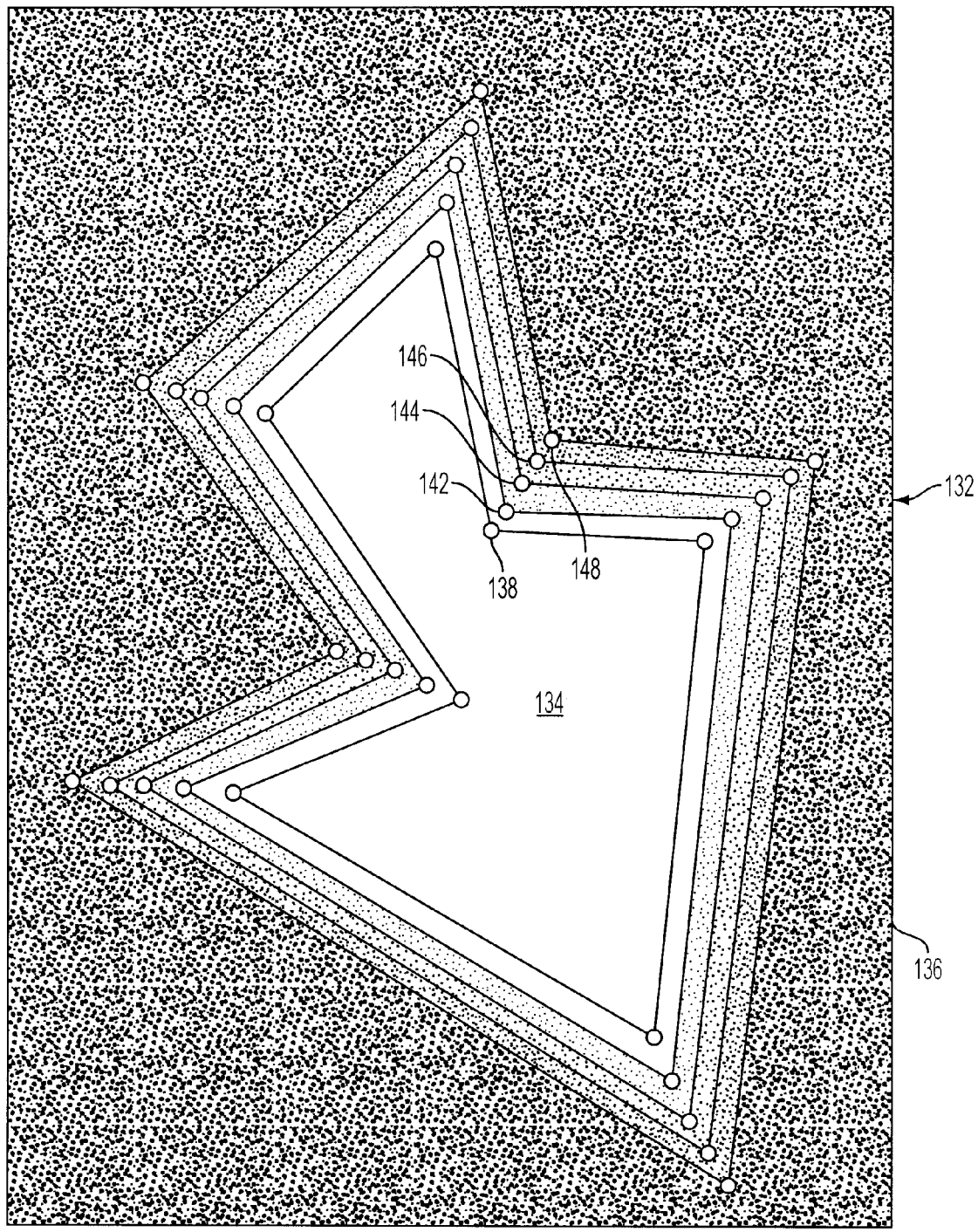
FIG. 6 shows a mask used in producing the spotlight.

Masking the region of the screen where the spotlight will be shown preferably creates the spotlight or spotlight effect. The mask can be circular resulting in a circular spotlight 20 as is shown in FIG. 1 or the mask 132 can be any polygonal shape as depicted in FIG. 6. The mask 132 includes a central transparent region 134 and an outer black or non-transparent region 136. The geometry is then rendered as rectangular polygons, quadric disks, and/or irregular polygons (depending on the desired shape of the spotlight) to a stencil buffer. Soft edges of the spotlight are rendered by iteratively moving each vertex, for example vertex 138 of the transparent geometry perpendicular to the local tangent and away from the center creating vertices 142-148 and corresponding larger spotlight geometries. The spotlight is re-rendered to the screen buffer with gradated transparency for each of the larger spotlight geometries. One large rectangle is then drawn over the entire screen to cover the areas not lit by the spotlight. The stencil buffer ensures that this final rectangle is not drawn where the gradation and the interior region was drawn. The stencil or mask is 132 is composited with the display contents at position on the display required. Compositing of a black pixel with a white pixel will result in a pixel that is darkened by 50%, the moving spotlight embodiment. Compositing the mask with a weighting of 3:1 produces the 75% darkening of the stationary spotlight embodiment. Darkening percentages can be adjusted as desired by adjusting the compositing weighting.

Figure 7:
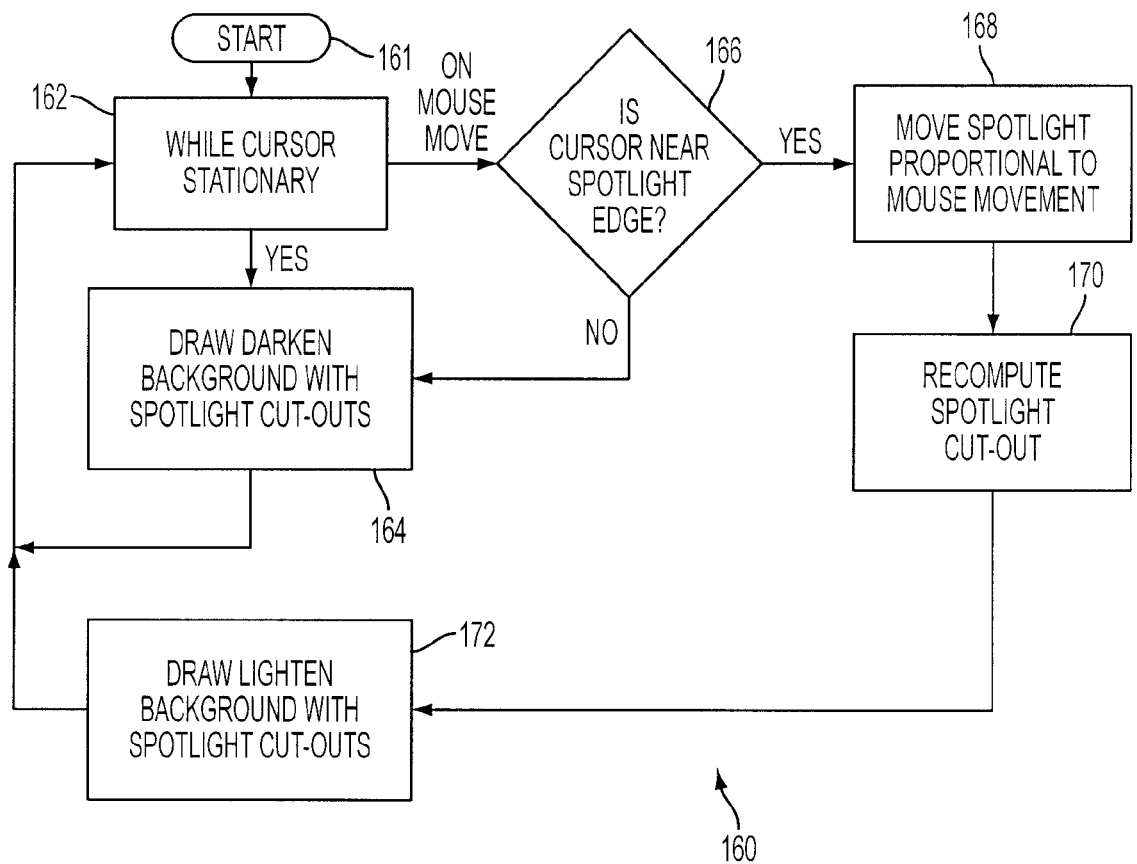
FIG. 7 shows a spotlight process.

The spotlight operations 160, as depicted in FIG. 7, at the start 161 place the center of the spotlight mask at the location of the user positioned cursor when the user activates the system, such as by activating a spotlight button. Then the system determines 162 whether the cursor is stationary and produces 164 the darkest darkened or most de-emphasozed background (see FIG. 8). If the cursor is moving, a determination is made 166 as to whether the cursor is at or near the edge of the spotlight. If not, the most de-emphasis is produced 164. If the cursor is at the edge, the spotlight is moved 168 proportional to the mouse movement as discussed in the related application previously mentioned. The mask or stencil is then recomputed 170 and the lighter darkening or less de-emphasis is applied 172 (see FIG. 8) to the background for the moving spotlight.

Figure 8:
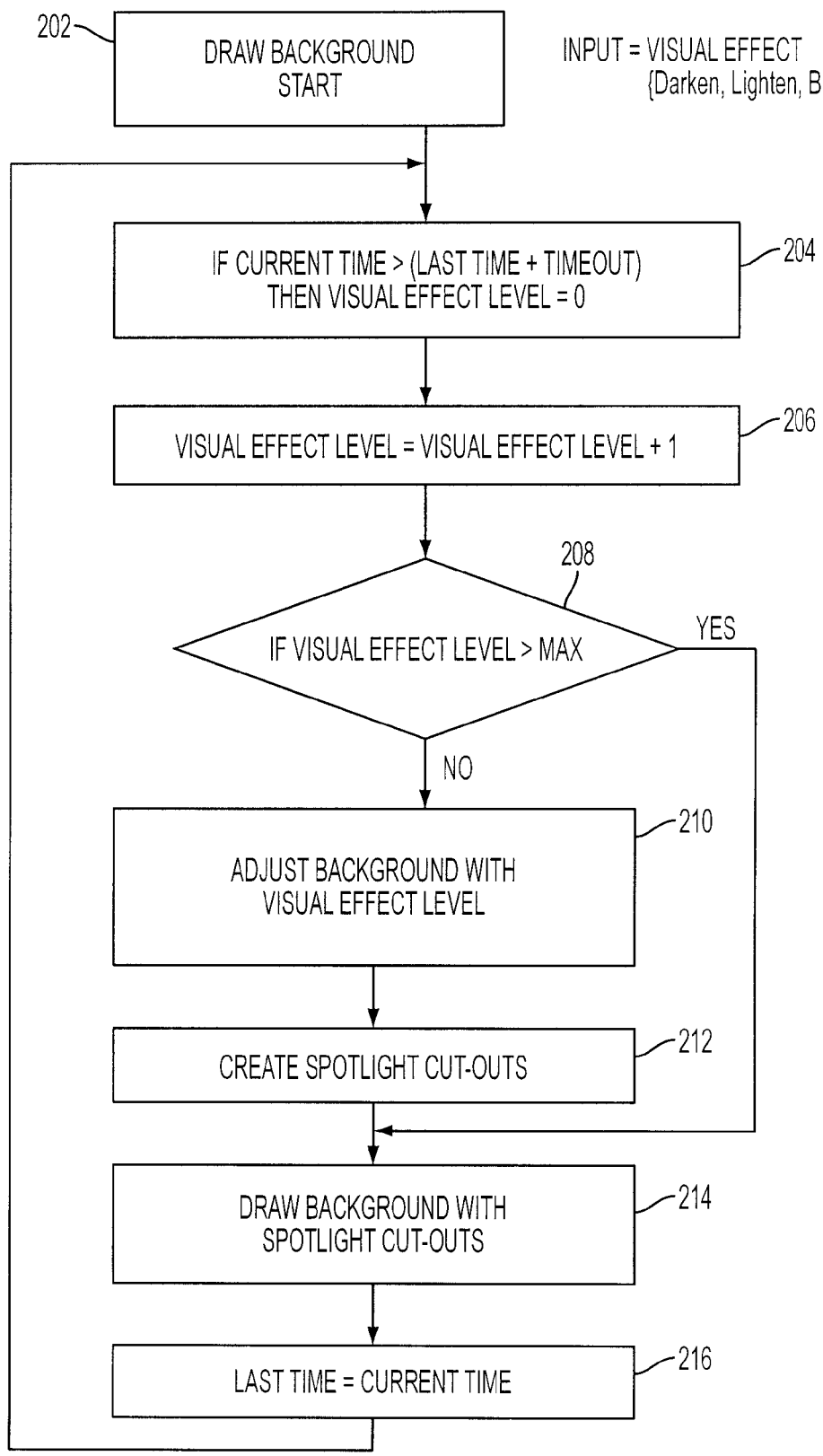
FIG. 8 shows a spotlight darkening transition process.

As noted above, the spotlight background changes in the amount of de-emphasis responsive to whether the spotlight is being moved. This change in de-emphasis (or visual effect—darkening, lightening, blur, contrast, saturation, tint, etc.) can be progressive over time during a transition period as depicted in FIG. 8. When the background draw operation starts 202, the system determines 204 whether the transition period has been completed. If so, the transition is complete and the visual effect level is set to 0. If not, the visual effect level is incremented 206 and tested 208 to determine whether it is greater than the maximum. If not, the background level is adjusted 210 and then new cutout or stencil is produced 212. This new stencil is applied 214 and the time is set 216.

Figure 9:
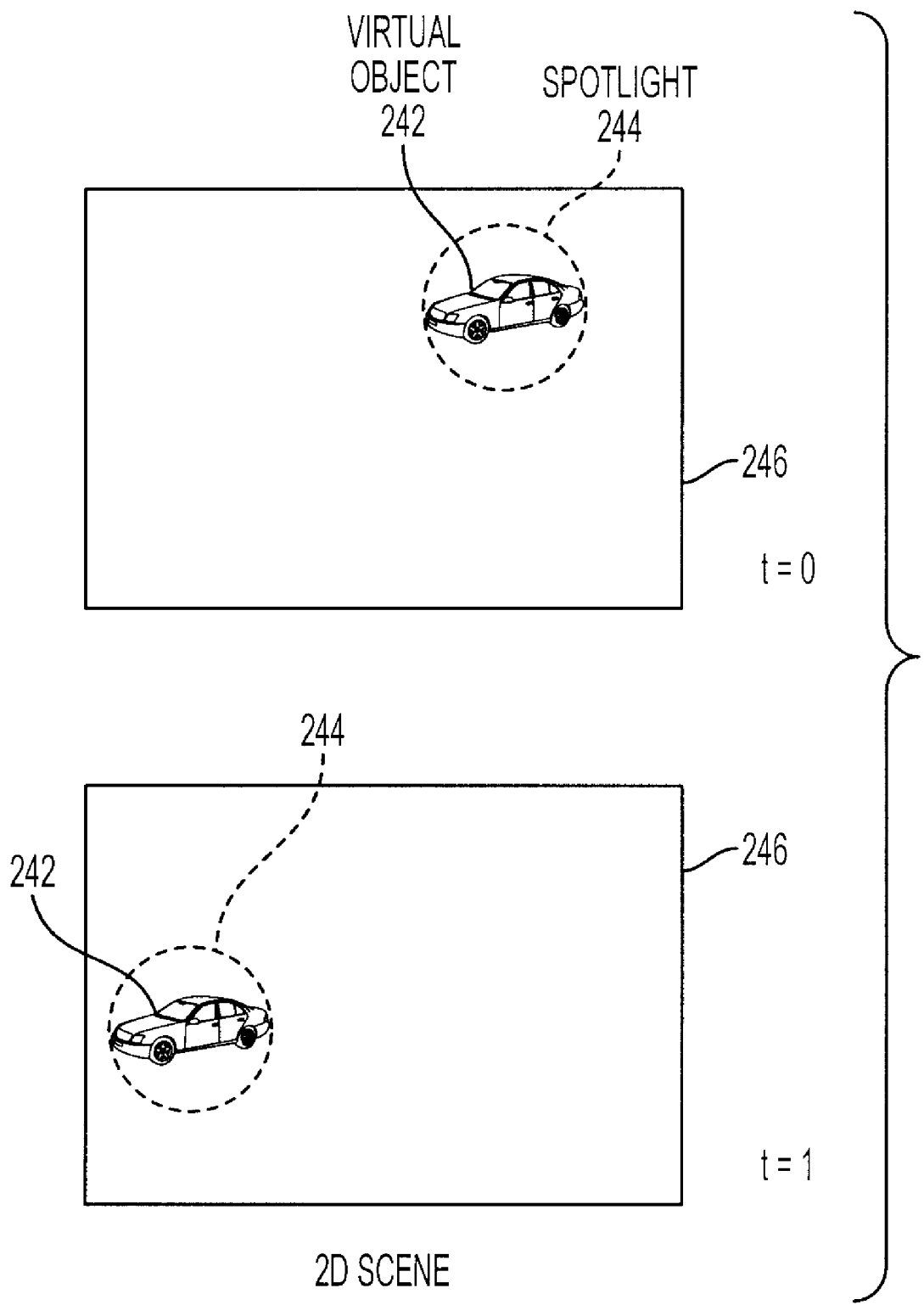
FIG. 9 shows object following by a spotlight.

The spotlight can be made to follow an object in a scene as depicted in FIG. 9. In the two snap shots (t=0, 1) of FIG. 9 a virtual object 242 has a spotlight 244 that follows the object 242 as it moves across the display 246.

Figure 10A:
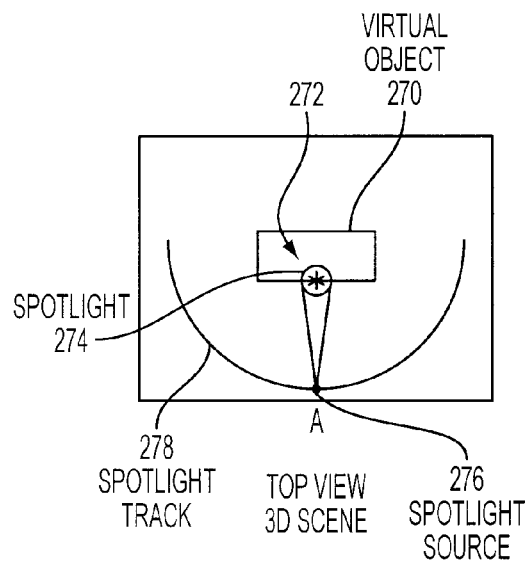
FIG. 10 shows types of following behavior.
Figure 10B:
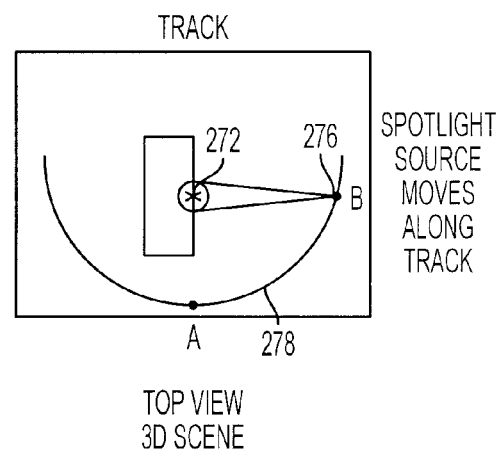
Figure 10C:
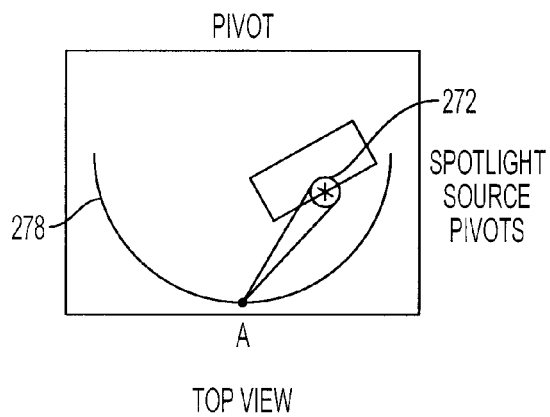
Figure 10D:
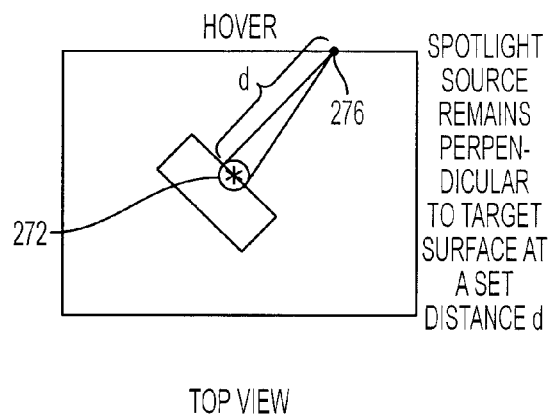

The following behavior of the spotlight can have several embodiments as depicted in FIGS. 10(a)-10(d). As depicted in FIG. 10(a) a virtual object 270 with a spotlight target point 272 is shown with a spotlight 274 "produced" from a spotlight source 276 positioned along a spotlight track. A track type following behavior is shown in FIG. 10(b) where as the object moves, the source 276 moves along the track 278 to keep the target point 272 spotlighted by the beam type spotlight. A pivot type following behavior is shown in FIG. 10(c) where the source remains fixed in place on the track 278 and the spotlight beam pivots to follow the target 272. FIG. 10(d) shows a following behavior that does not use a track and keeps the source 276 perpendicular to the object surface at the target point 272 at a fixed distance "d".

Figure 11:
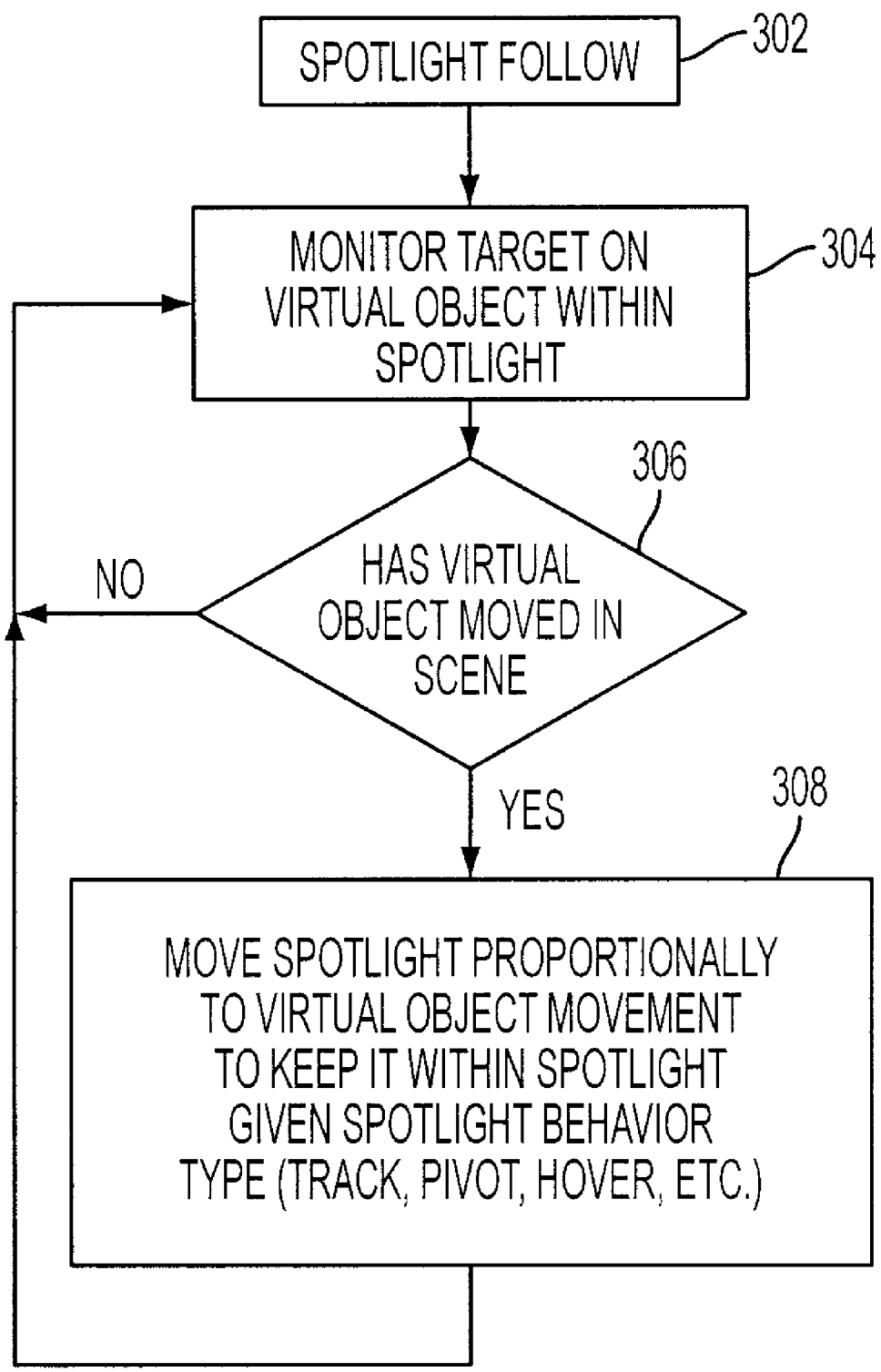
FIG. 11 shows a following process.

FIG. 11 illustrates the operations of spotlight following of a moving object. When the spotlight following starts 302, the target on the object is monitored 304. If the target moves 306, the spotlight is moved 308 proportionately responsive to the type of following behavior.

The content on the large display can be an animation or movie (or multiple windows each having a movie/animation playing back). Thus the spotlight could alter temporal attributes where, for example, the exterior region suppresses playback while the interior region allows for normal speed animation/movie playback (or visa versa where playback is allowed in the exterior region of the spotlight while the interior region of the spotlight has stopped playback). Alternative temporal adjustments could be to speed up or slow down the content within or outside of the spotlight region. Similarly, the content can be motion based (e.g., little creatures moving around in the space or objects that are moving in-place). The spotlight can determine if the content in the interior or exterior portion of the spotlight remains active or inactive (e.g., stops moving).

The spotlight can also determine what portion of the display (e.g., within the spotlight) is to be rendered in a higher quality than the rest of the scene.

As discussed previously, spotlights can be used with support for multiple users pointing at the large display, with a variety of input devices such as mouse, laser pointer, or by physically pointing. A content-aware spotlight can also be used that will size itself to the relevant content being highlighted.

The content of the display that is being spotlighted can be 2D or 3D. The spotlight can also have the background less dark when the cursor moves within the spotlight so that the viewer can see the context of the cursor movement better. The display used for the presentation on which the spotlight moves can be non-flat and the spotlight can have a shape that is adapted to the shape of the display or the content.

The embodiments discussed herein can also be applied to the smaller type of display associated with desktop and laptop computers where a user desires to focus the attention of viewers on a portion of the display. The system can also be associated to multiple distributed displays in a collaborative session where each participant's display shows the 2D or 3D application data and one or more spotlights.

The system also includes permanent or removable storage, such as magnetic and optical discs, RAM, ROM, etc. on which the process and data structures of the present invention can be stored and distributed. The processes can also be distributed via, for example, downloading over a network such as the Internet.

Additional information related to the invention described herein can be found in "Spotlight: Directing Users' Attention on Large Displays" by Khan, et al, CHI Papers, April 2005 incorporated by reference herein.

Attached hereto and incorporated by reference herein is a CD ROM including a video thereon that can be played with Windows Media Player TM that shows spotlight operation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A process, comprising:
    generating a display by a processing device;
    darkening a portion of the display having a lesser degree of interest having a spatial correspondence with a cursor position thereby correlating a darkened portion of the display directly with a movement of the cursor; and
    un-correlating the darkened portion of the display with the cursor position when the cursor position is moved within a boundary of the darkened portion of the display.

2. A process as recited in claim 1, wherein the darkening comprises confining the darkening in display to outside of a circular region.

3. A process as recited in claim 1, wherein a circle designates the portion.

4. A process comprising:
    generating a display by a processing device;
    darkening a portion of the display having a lesser degree of interest having a spatial correspondence with a cursor position, wherein a circle designates the portion;
    allowing the user to move the cursor position; and
    moving the circle when the cursor encounters an edge of the circle, and un-correlating the darkened portion of the display with the cursor position when the cursor position is moved beyond the edge of the circle.

5. A process as recited in claim 4, further comprising changing darkening during the moving.

6. A process as recited in claim 5, wherein the darkening is lessened during the moving.

7. A process as recited in claim 1, further comprising providing an attention direction region for directing a viewer's attention to an area of a higher degree of interest.

8. A process as recited in claim 7, wherein the region comprises one of a beam, a curtain, a cone, an object shape, and an ellipse.

9. A process as recited claim 1, wherein the darkening comprises applying a mask having a transparent region for a portion of the display having a higher degree of interest.

10. A process as recited in claim 9, wherein the mask has surrounding regions of graduating density.

11. A process as recited in claim 1, further comprising allowing a size and shape of the portion to be user controlled or system controlled.

12. A process, comprising:
    generating a display by a processing device; and
    spotlighting a portion of the display by darkening the portion of the display outside a circular region designated by a user with a cursor by applying a mask having a transparent center region at a cursor location and having surrounding regions of graduating increase in density;

allowing the user to move the cursor in the circular region;

moving the circular region in a direction of cursor movement when the cursor encounters an edge of the circular region; and reducing the darkening during the moving.

13. A process, comprising:

allowing a user to designate a portion of a display using a cursor having a spatial correspondence with the portion;

darkening the display outside the portion by a processing device, thereby correlating a darkened portion of the display directly with a movement of the cursor; and un-correlating the darkened portion of the display with the cursor when the cursor is moved within a boundary of the darkened portion of the display.

14. A process, comprising:

generating a display by a processing device; and allowing a user to designate a portion of the display with a spotlight having a spatial correspondence with the designation thereby correlating a darkened portion of the display directly with a movement of the designation; and un-correlating the darkened portion of the display with the designation when the designation is moved within a boundary of the darkened portion of the display.

15. A process as recited in claim 14, wherein the spotlight comprises a circular region outside of which the display is darkened.

16. A display generated by a computer, comprising:

a scene generated by the computer;

a darkened portion of the scene having a lesser degree of interest spatially correspondent to a position designated by the user and correlating the darkened portion of the scene directly with a movement of the designation by the user; and un-correlating the darkened portion of the scene with the position designated by the user when the position is moved within a boundary of the darkened portion of the scene.

17. A system, comprising:

a display;

a computer producing a scene displayed on the display and having a darkened portion of the scene having a lesser degree of interest as designated by a cursor having a spatial correspondence with the portion and which correlates directly with a movement of the cursor; and un-correlating the darkened portion of the scene with the cursor when the cursor is moved within a boundary of the darkened portion of the scene.

18. A system as recited in claim 17, wherein scene content is 3D.

19. A system, comprising:

a display;

a computer producing a scene displayed on the display and having a de-emphasized portion of the scene having a lesser degree of interest as designated by a cursor having a spatial correspondence with the portion and which correlates directly with a movement of the cursor; and remote display and remote computer interactively connected to present the scene and the portion for collaboration.

20. A computer readable storage for controlling a computer and storing a process performed by the computer, comprising:

generating a display and darkening a portion of the display having a lesser degree of interest as designated by a cursor having a spatial correspondence with the portion and which correlates directly with a movement of the cursor; and un-correlating the darkened portion of the display with the cursor when the cursor is moved within a boundary of the darkened portion of the display.

21. A display generated by a computer, comprising:

a scene generated by the computer;

a spotlighted portion of the scene spatially correspondent to a position of a cursor controlled by a user thereby correlating a darkened portion of the scene directly with a movement of the cursor; and un-correlating the darkened portion of the scene with the cursor when the cursor is moved within a boundary of the darkened portion of the scene.

22. A process as recited in claim 1, wherein the darkening comprises one of darkening, blurring, de-saturating, de-tinting, de-coloring, de-activating and temporally adjusting the portion.

23. A process, comprising:

generating a display by a processing device;

de-emphasizing a portion of the display having a lesser degree of interest having a spatial correspondence with a cursor position; and un-correlating an un-emphasized portion of the display with a cursor position when a cursor is moved within a boundary of the un-emphasized portion of the display.

24. A process, comprising:

generating a display by a processing device;

darkening a portion of the display having a lesser degree of interest, the degree of interest having an adjustable spatial correspondence with a cursor position thereby correlating a darkened portion of the display directly with a movement of the cursor, wherein the darkening is temporarily lessened during the movement of the cursor; and un-correlating the darkened portion of the display with the cursor position when the cursor position is moved within a boundary of the darkened portion of the display.

25. A system, comprising:

a display;

a computer producing a scene displayed on the display and having a darkened portion of the scene having a lesser degree of interest as designated by a cursor having a spatial correspondence with the portion and which correlates directly with a movement of the cursor, wherein the darkened portion of the screen is temporarily less darkened during the movement of the cursor; and un-correlating the darkened portion of the scene with the cursor when the cursor is moved within a boundary of the darkened portion of the scene.

26. A method, comprising:

designating a portion of a display generated by a processing device and within a boundary associated with a movable cursor;

darkening another portion of the display exterior to the boundary; and un-correlating the darkened portion of the display with the movable cursor when the movable cursor is moved within a boundary of the darkened portion of the display.

* * * * *

UNITED STATES PATENT AND TRADEMARK OFFICE
CERTIFICATE OF CORRECTION

PATENT NO. : 7,656,413 B2  
APPLICATION NO. : 11/391645  
DATED : February 2, 2010  
INVENTOR(S) : Azam Khan et al.

It is certified that error appears in the above-identified patent and that said Letters Patent is hereby corrected as shown below:

Column 4, Line 45, change "de-emphasozed" to --de-emphasized--.

Column 7, Line 16, after "device;" delete "and".

Signed and Sealed this

Twenty-seventh Day of April, 2010

David J. Kappos  
*Director of the United States Patent and Trademark Office*